I. W. Dawson,
Stretching Leather.
No. 2,791. Reissued Oct. 29, 1867.
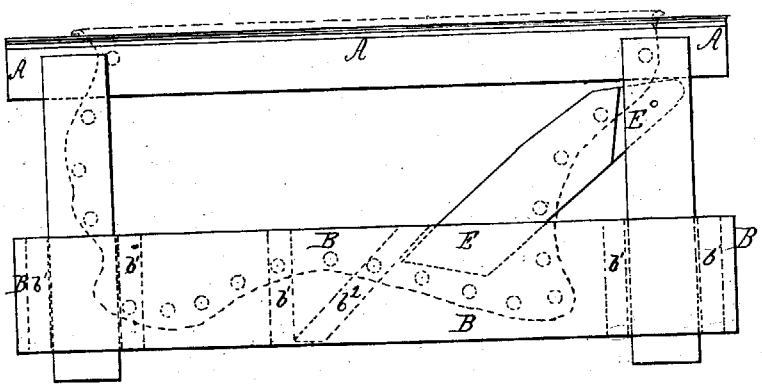
Witnesses:
Wm. Trewin
J. Blockley
Inventor:
J. W. Dawson
Per Munn & Co
Attorneys

United States Patent Office.

ICHABOD W. DAWSON, OF NEWARK, NEW JERSEY.

*Letters Patent No.* 66,131, *dated June* 25, 1867; *reissue No.* 2,791, *dated October* 29, 1867.

DIVISION B.

IMPROVED MODE OF STRETCHING AND PREPARING LEATHER AND HIDES.

The Schedule referred to in these Letters Patent and making part of the same.

TO ALL WHOM IT MAY CONCERN:

Be it known that I, ICHABOD W. DAWSON, of Newark, county of Essex, and State of New Jersey, have invented a certain new and useful Process of Stretching Leather and Hides; and I do hereby declare that the same is fully and clearly set forth in the following description, and that the drawings and description thereof set forth one manner of carrying out the said process.

The object of my invention is to stretch hides or leather evenly in all directions, and so as to bring out all the wrinkles and folds in the same and leave the surface smooth and better prepared for the subsequent finishing operations.

A is the bar of the frame for supporting the middle of the hide. B is a second bar or bars, parallel to A, and to which, on its opposite sides, the hide's side edges are suitably secured, either by tacks or otherwise. C D are arms attached to one of the bars, the other ends of the same working in suitable grooves or slots in the other bar. These arms are for the purpose of guiding and insuring the proper action of the bars A B. E is an arm pivoted to the arm C near the bar A. The end of the bar E hangs down and enters a groove or opening in or between bar or bars B. The side $b^2$ of the opening in which the arm E enters is inclined from a vertical position, as shown; and when the bars A B are moved apart, the end of arm E, coming against the inclined side $b^2$, will be moved gradually from its central position towards the arm to which it is pivoted, and in this manner stretch the hide, which is suitably secured to that arm lengthwise.

When it is desired to stretch and dry a hide, it is first laid evenly over the bar A; the hide's side edges are brought to opposite sides of the bar or bars B and there secured, the neck being also secured to arm E. Then, by means of one or more jack-screws or any equivalent or suitable mechanism, the bars are gradually forced apart, the arm E, by the same movement, being thrown to the side, thus gradually and evenly stretching the hide in the direction of its length and breadth.

To stretch hides or leather successfully, and to dry the same while greatly distended, and prevent their cockling, it is necessary that the centre of the hide be supported throughout its length, and that each edge be held positively and firmly, and that the power for stretching the same should be applied to the middle of the hide and throughout its length, or that the same be strained over a bar supporting the centre of the hide. The strain exerted in this manner is at all times equally distributed over the entire hide, as will readily be seen, and it is impossible for one portion of the hide to be stretched more than another, which would leave the surface of the leather uneven. The central support effectually prevents cockling, and the hides or leather can be stretched to their fullest extent, and the surface of the same kept smooth and even.

Having described my invention, and illustrated one way of putting the same in practice, what I claim as new, and desire to secure by Letters Patent, is—

The process, substantially as herein described, of stretching leather or hides.

ICHABOD W. DAWSON.

Witnesses:

JACOB H. DAWSON, Jr.,

JNO. R. ELLIOTT.